United States Patent [19]

Wilczynski

[11] Patent Number: 5,049,416
[45] Date of Patent: Sep. 17, 1991

[54] METHOD FOR PREPARING PRESSURE-SENSITIVE ADHESIVES ARTICLES

[75] Inventor: Joseph J. Wilczynski, Yorba Linda, Calif.

[73] Assignee: Union Oil Company of California, Los Angeles, Calif.

[21] Appl. No.: 531,300

[22] Filed: May 31, 1990

Related U.S. Application Data

[62] Division of Ser. No. 140,039, Dec. 31, 1987, abandoned.

[51] Int. Cl.$^5$ ............................................... B05D 5/10
[52] U.S. Cl. .................................................. 427/208.4
[58] Field of Search ...................................... 427/208.4

[56] References Cited

U.S. PATENT DOCUMENTS

| | | | |
|---|---|---|---|
| 3,345,336 | 10/1967 | Kuhlkamp et al. | 260/63 |
| 3,459,790 | 8/1969 | Smith | 260/483 |
| 3,488,708 | 1/1970 | Smith | 96/84 |
| 3,554,987 | 1/1971 | Smith | 260/79.3 |
| 3,607,834 | 9/1971 | Marx et al. | 260/63 R |
| 3,658,878 | 4/1972 | Smith | 260/465.4 |
| 3,729,338 | 4/1973 | Lehmann et al. | |
| 4,016,127 | 4/1977 | Larsson et al. | 260/29.6 TA |
| 4,408,018 | 10/1983 | Bartman et al. | 525/300 |
| 4,421,889 | 12/1983 | Braun et al. | 524/381 |
| 4,540,739 | 9/1985 | Midgley | 524/764 |

FOREIGN PATENT DOCUMENTS

| | | |
|---|---|---|
| 1144486 | 3/1969 | United Kingdom . |
| 1185216 | 3/1970 | United Kingdom . |
| 1541909 | 3/1979 | United Kingdom . |

OTHER PUBLICATIONS

D. A. Upson, "Journal of Polymer Science: Polymer Symposium", John Wiley and Sons, Inc., 1985, 72 (pp. 45–54).

Derwent Abstract 85-056921/10 (of German patent DE 3329-622), 1985, Derwent Publications Ltd. (2 Pages).

*Primary Examiner*—Bernard Pianalto
*Attorney, Agent, or Firm*—Gregory F. Wirzbicki; Michael A. Kondzella

[57] ABSTRACT

There are disclosed normally tacky, pressure-sensitive adhesive compositions comprising one or more normally tacky polymers having a $T_g$ of about 0° C. or less and containing (a) at least about 40 weight percent of at least one polymerized olefinically unsaturated carboxylic acid ester monomer in the polymer backbone and (b) pendant functional groups attached to the backbone and having the formula:

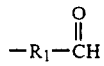

wherein $R_1$ is (i) a covalent bond which directly connects the carbonyl carbon atom of the —CHO group to a carbon atom in the backbone of the polymer or (ii) a divalent organic radical comprising a carbon atom which directly adjoins the carbonyl carbon atom of the —CHO group, the polymers also being normally tacky when cured. Such polymers have improved cohesive strength (shear holding value) with little or no detriment to adhesive tack or adhesion (peel resistance), and these improvements are realized without the necessity of incorporating crosslinking monomers such as N-methylolamides or other crosslinking agents. Pressure-sensitive adhesive, water-based emulsions containing such polymers and pressure-sensitive adhesive articles comprising a substrate having at least a portion of one surface thereof coated with the adhesive compositions are also disclosed.

14 Claims, No Drawings

METHOD FOR PREPARING PRESSURE-SENSITIVE ADHESIVES ARTICLES

This application is a division of application Ser. No. 07/140,039, filed Dec. 31, 1987, abandoned.

BACKGROUND

Field of the Invention

This invention relates to the field of pressure-sensitive adhesives and to articles comprising such adhesives.

Introduction

Normally tacky, pressure-sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources. Maintaining the requisite balance of such properties while improving one or more characteristics of such pressure-sensitive adhesives is both difficult and unpredictable. Any modification of adhesive compositions which improves one adhesive property may detrimentally affect one or more other desirable properties. For instance, it is difficult to improve an adhesive's internal strength (cohesiveness and shear) without reducing one or more other desirable properties.

Interpolymers of olefinically unsaturated carboxylic acid ester monomers have received wide attention as pressure-sensitive adhesives due to the relatively good balance of properties they afford in many applications. However, many PSA applications require shear strength values higher than those that can be provided by the carboxylic acid ester polymers employed in many PSAs. Some applications require shear strength values of at least about 50 minutes and preferably higher, i.e. on the order of 500 to 10,000 minutes (determined by the shear value test described hereinafter). While there are various ways of improving PSA shear strength, many if not all of these detrimentally affect one or more other properties desirable in certain applications. For example, the molecular weight of carboxylic acid ester polymers can be increased to improve shear strength, but this route generally results in reduced tack and lower adhesion. Polar monomers, such as polymerizable carboxylic acids, can be added to the polymer to increase cohesive strength, but this procedure may result in low adhesion and tack. Crosslinking monomers, such as the N-methylol amides, or other crosslinking agents can be incorporated into the composition, but these procedures generally require expensive reagents and result in low tack and adhesion (peel resistance). Their use also may reduce processability and may impair other properties such as clarity, color stability and UV stability.

The suitability of pressure sensitive adhesive compositions is also influenced to a large extent by the ease of manufacture of both the adhesive and of articles containing the adhesive and by environmental and personnel safety hazards. For instance, PSAs are typically applied to a backing as hot melts, polymer solutions or as dispersions of a polymer in an aqueous medium. Such solutions and dispersions must possess properties which facilitate their use in the manufacture of PSA-containing articles. Thus, the melt, solution or dispersion, as well as the polymer per se, must adequately wet the backing to assure adequate adhesive distribution, coverage and bonding to the backing.

The chemical composition of the PSA polymer carriers (when used) is also significant for several reasons. The use of solvents other than water is becoming more and more undesirable due to solvent expense and the cost and hazards involved in controlling solvent vapors. Yet such solvents are often necessary for adequate distribution and handling of polymers that cannot be employed effectively in water-based systems. Thus, water-based polymer latexes are much preferred in the adhesive manufacturing industry provided that the necessary physical and chemical properties of the finished article can be achieved. However, substantial loss of one or more physical properties often results from substitution of water-based latexes or hot melts for solvent-based polymer systems.

N-methylol amide functional groups and other crosslinking monomers or agents are known to improve physical performance in several respects. However, the resulting polymers release formaldehyde upon curing or can result in the presence of potentially toxic residues in the finished article. In particular, N-methylol amide-containing polymers release formaldehyde when cured, and they can result in formaldehyde residues in the finished product. Formaldehyde is coming under ever-increasing scrutiny in both the workplace and home and it is particularly undesirable in medical and personal contact applications, such as adhesive bandages. For example, the state and federal Occupational Health and Safety Administrations (OSHA) have set stringent formaldehyde exposure limits for industrial workers.

Various rheological properties of water-base latexes are particularly important with regard to the suitability of such latexes for adhesive article manufacture. Latex particle size and particle size distribution can significantly influence latex physical properties which affect application of the latex to a backing. Similarly, latex viscosity can limit latex utility in adhesive article manufacture due to the influence of viscosity on adhesive distribution, filler loading (of the latex) and wetting of the adhesive article backing.

Yet further demands are placed on the chemical composition and physical properties of low-temperature pressure-sensitive adhesives, i.e., adhesives intended for use at relatively low temperatures. Often, PSAs which have adequate cohesive and adhesive strength at low temperatures are so "gummy" at ambient conditions that they complicate both adhesive handling at ambient temperatures and the manufacture of adhesive-containing articles. Such gumminess also causes "creep" and "bleed-through" on labels and other backings.

Thus, it can be seen that the physical and chemical properties desired in adhesive compositions and articles, and in the polymer solutions, dispersions and melts employed in the manufacture of adhesive articles, place various, sometimes conflicting, demands on polymer composition and on the polymer carrier, i.e. solvent or water, if used. It is desirable to obtain a polymer system, preferably a waterbased or hot-melt system, which possesses a balance of properties suitable for the manufacture of pressure-sensitive adhesives and PSA-containing articles.

DESCRIPTION OF THE INVENTION

It has now been found that pressure-sensitive adhesives, and articles containing pressure-sensitive adhesives, having an improved balance of PSA properties including improved shear holding value and acceptable adhesive strength (peel resistance) and tack, can be obtained by employing, as a component of the adhesive, a normally tacky polymer having a $T_g$ of about 0° C. or less and containing (a) at least about 40 weight percent of at least one polymerized olefinically unsaturated carboxylic acid ester monomer (i.e., at least about 40 weight percent of one or more polymerized unsaturated carboxylic acid ester monomers) and (b) pendant functional groups of the formula:

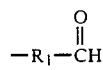
(1)

wherein $R_1$ is (i) a covalent bond which directly connects the carbonyl carbon atom of the —CHO group to a carbon atom in the backbone of the polymer or (ii) a divalent organic radical comprising a carbon atom which directly adjoins the carbonyl carbon atom of the —CHO group, the polymer also being normally tacky when cured. As used herein, the term "organic radical" means any radical containing at least one carbon atom. Functional groups within formula 1 wherein $R_1$ is different can be contained in the same polymer molecule, and polymers containing different $R_1$s can be blended in the same solution, dispersion or hot melt. The polymers can be manufactured and applied to backings as solutions, aqueous dispersions, hot melts or combinations of two or more of these forms. Aqueous dispersions and melts are preferred since they eliminate the costs and hazards associated with polymer solvents other than water. Such pressure-sensitive adhesives and adhesive articles have an improved balance of properties. In particular, they possess improved or increased cohesive strength without significant, if any, loss or decrease of adhesion or tack relative to PSAs which are identical except not containing pendant functional groups of formula (1) above. The PSAs and articles of this invention are relatively clear, colorless materials (unless intentionally colored by the addition of colorants), and they possess adequate color stability and resistance to sunlight and other ultraviolet sources. The PSAs of this invention do not require the use of cross-linking agents and catalysts, such as N-methylol amide monomers, although they may contain one or more of such materials. The low $T_g$ polymers which are useful as low-temperature pressure-sensitive adhesives, (i.e., PSAs intended for use at low temperature, e.g., about 10° C. or less) have adequate cohesive and adhesive strength at low temperatures yet are not excessively or unacceptably gummy at ambient temperatures.

DETAILED DESCRIPTION OF THE INVENTION AND OF THE MANNER AND PROCESS OF MAKING AND USING IT

Normally tacky and pressure sensitive adhesive compositions are provided which comprise a normally tacky polymer having a $T_g$ of about 0° C. or less and containing (a) at least about 40 weight percent of at least one polymerized olefinically unsaturated carboxylic acid ester monomer and (b) pendant functional groups of the formula:

(1)

wherein $R_1$ is a (i) covalent bond which directly connects the carbonyl carbon atom of the —CHO group to a carbon atom in the backbone of the polymer (i.e., the carbonyl carbon atom being directly bonded to a carbon atom in the backbone or main chain of the polymer) or (ii) a divalent organic radical comprising a carbon atom which directly adjoins the carbonyl carbon atom of the —CHO group, the polymer also being normally tacky when cured. Functional groups within formula (1), supra, wherein $R_1$ is different can be contained in the same polymer molecule, and polymers containing different $R_1$s can be blended in the same solution, dispersion or hot melt. It is essential only that the useful polymers (1) contain at least one polymerized olefinically unsaturated carboxylic acid ester monomer (i.e., the polymerized residue of such unsaturated monomer) and (2) contain aldehyde-containing or aldehyde-forming pendant functional groups, as illustrated. The structure of $R_1$, including its molecular weight and elemental composition, if any, does not negate the effectiveness of the aldehyde functionality of the polymer. Thus, $R_1$ can be a covalent bond or divalent organic radical of any molecular weight effective to allow attachment of the pendant functional groups to the polymer backbone, for example, (a) as part of a polymerizable olefinically unsaturated monomer by way of copolymerization thereof or (b) by substitution onto a preferred polymer backbone ("Backbone") by any suitable reaction, e.g.:

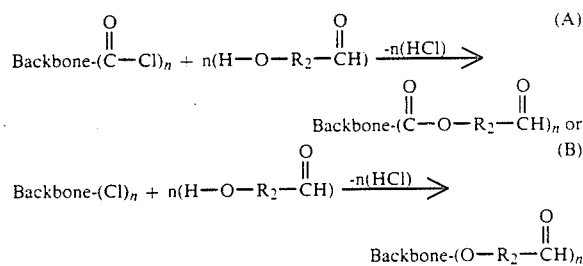

In reactions (A) and (B), supra, n is an integer, and O—$R_2$ is $R_1$ in formula (1), supra, $R_2$ being a divalent organic radical, usually of not more than 100 atoms in length. $R_1$ can contain heteroatoms, such as oxygen, sulfur, phosphorus, and nitrogen; functional groups such as carbonyl, carboxy-ester, thio, and amino substituents; and can comprise aromatic, olefinic or alkynyl unsaturation. Typically, $R_1$ will be a covalent bond or a cyclic or acyclic divalent organic radical of up to about 40 atoms in length, i.e., having up to about 40 atoms in its shortest chain between the polymer backbone and the —CHO group. Where $R_1$ is a divalent organic radical as described supra, such radical preferably contains no more than 20 atoms in its shortest chain between the polymer backbone and the —CHO group.

$R_1$ may be, for example, a divalent organic radical of the formula:

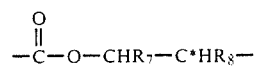
(a)

-continued $$-\overset{O}{\underset{\|}{C}}-O-(CH_2CH_2O)_n-CHR_7-C^*HR_8- \quad (b)$$

$$-\overset{O}{\underset{\|}{C}}-NR_9-CHR_7-C^*HR_8- \text{ or} \quad (c)$$

$$-Bz-O-CHR_7-C^*HR_8- \quad (d)$$

wherein Bz is a divalent benzene ring, $R_7$, $R_8$, and $R_9$ are independently selected from H and alkyl radicals, preferably not having more than 10 carbon atoms (e.g., methyl), n is an integer from 1 to 10, and the asterisk (*) indicates the carbon atom which directly adjoins the carbonyl carbon atom of the —CHO group in formula (1), supra. $R_1$ is preferably a covalent bond.

To illustrate, the pendant functional groups of formula (1) can be included in the polymer by copolymerization of other monomers (discussed hereinafter) with a polymerizable functional monomer of the formula:

$$R_6-CH=\overset{R_5}{\underset{|}{C}}-R_1-\overset{O}{\underset{\|}{C}}H \quad (2)$$

wherein $R_1$ is as defined for formula (1), supra, $R_5$ and $R_6$ are independently selected from hydrogen, hydroxy, halo, thio, amino, and monovalent organic radicals, preferably having up to 10 atoms other than hydrogen, most preferably alkyl radicals having 1 to 10 carbons atoms.

Functional monomers of formula (2), supra, can be prepared by the well-known Michael addition reaction. For example, the monomer of formula (2) wherein (i) $R_1$ is given by formula (a) supra wherein $R_7$ and $R_8$ are both hydrogen, (ii) $R_5$ is hydrogen and (iii) $R_6$ is hydrogen, can be prepared by the Michael addition reaction of acrylic acid with acrolein, illustrated as follows:

$$H_2C=CH-\overset{O}{\underset{\|}{C}}-O-H + H_2C=CH-\overset{O}{\underset{\|}{C}}H \longrightarrow$$

$$H_2C=CH-\overset{O}{\underset{\|}{C}}-O-CH_2-CH_2-\overset{O}{\underset{\|}{C}}H.$$

Because $R_1$ is preferably a covalent bond, preferred functional monomers have the formula $$R_6-CH=\overset{R_5}{\underset{|}{C}}-\overset{O}{\underset{\|}{C}}H \quad (3)$$

where $R_5$ and $R_6$ have the definitions given above. Monomers within formula (3), supra, include, for example, (a) unsubstituted 2-alkenals, e.g., acrolein (i.e., 2-propenal), 2-butenal, 2-pentenal, 2-hexenal, 2-heptenal, 2-nonenal, and 2-decenal; (b) the corresponding 2-methyl-2-alkenals, e.g., methacrolein (i.e., 2-methyl-2-propenal), 2-methyl-2-butenal, and the like; and (c) the corresponding 2-ethyl-2-alkenals, e g., 2-ethyl-2-propenal, 2-ethyl-2-butenal, and the like. Preferably, $R_5$ is H or methyl and $R_6$ is H, in which case the functional monomer is selected from the group consisting of acrolein (most preferred), methacrolein and combinations thereof.

The normally tacky pressure-sensitive adhesive polymers contain a sufficient amount of one or more of the described functional monomers to increase cohesive strength of the adhesive relative to an otherwise identical pressure sensitive adhesive in the absence of such functional monomers. Detectable enhancement of cohesive strength is found in many polymers at functional monomer concentrations as low as 0.05 weight percent. Generally, however, the useful polymers will contain at least about 0.1 and typically at least about 0.25 weight percent of the functional monomer based on total polymer weight. Much higher functional monomer concentrations can be employed. Thus, functional monomer concentrations will usually be between about 0.1 to about 20 weight percent or, more typically, about 0.25 to about 10 weight percent. Surprisingly, very significant increases in cohesive strength can be achieved at functional monomer concentrations below 5 weight percent and even below 2 weight percent. Hence, preferred functional monomer concentrations in many of the useful pressure-sensitive adhesives will be within the range of about 0.1 to about 5 weight percent, often within the range of about 0.1 to about 2 weight percent.

The remainder of the polymer comprises, primarily, one or more polymerized olefinically unsaturated mono- and/or polycarboxylic acid esters, and optionally it may contain other polymerized olefinically unsaturated monomers as described more fully hereinafter. Thus, the polymers usually contain at least about 40 weight percent, often at least about 60 weight percent, and preferably at least about 80 weight percent polymerized olefinically unsaturated carboxylic acid ester monomers. Presently preferred ester monomers are esters of olefinically unsaturated mono- or polycarboxylic acids having 4-17 carbon atoms and hydroxy-, amino-, or thio-substituted or unsubstituted alcohols, amines, and thiols having from 1 to about 30 carbon atoms, preferably 1 to about 20 carbon atoms, per molecule. Illustrative unsaturated carboxylic acids are acrylic, methacrylic, fumaric, maleic and itaconic acids. Illustrative hydroxy-, amino-, and thio-substituted alcohols, amines, and thiols are glycerol, 1-hydroxy-5-thiododecane and 2-amino-5-hydroxyhexane. Presently preferred esters, due primarily to cost and availability, are hydroxy-substituted and unsubstituted alcohol esters of acrylic and methacrylic acids such as butyl acrylate ("BA"), 2-ethylhexyl acrylate ("EHA"), methyl methacrylate ("MMA") and hydroxyethyl acrylate ("HEA").

A wide variety of olefinically unsaturated carboxylic acid ester monomers, as well as a variety of other polymerizable olefinically unsaturated monomers useful for the manufacture of pressure-sensitive adhesive polymers, and the interrelationship of these monomers to polymer $T_g$ (glass transition temperature) are discussed by Satas in the Handbook of Pressure-Sensitive Adhesive Technology, Van Nostrand-Reinhold Company, New York, 1982, particularly at pages 298 through 329, including the references cited therein, the disclosures of which are incorporated herein by reference in their entireties. The principal characteristic of pressure-sensitive adhesives based on such carboxylic acid ester homo- or interpolymers is the low glass transition temperature ($T_g$) which can be achieved, in some instances, with carboxylic acid ester homopolymers but is usually obtained by polymerizing "hard" ester monomers with suitable proportions of "soft" ester monomers to form a polymer having the $T_g$ best suited to the particular application. So-called "hard" monomers are those which produce homopolymers having relatively high $T_g$s, while "soft" monomers are those which form homopolymers having relatively low $T_g$s. For instance, acrylate monomers are typically "softer" than the corresponding methacrylate esters. Thus, poly(ethyl acrylate) has a $T_g$ of $-22°$ C. while poly(ethyl methacrylate) has a $T_g$ of 65° C. The $T_g$ of poly(n-butyl acrylate) is $-54°$ C. as compared to a $T_g$ of 20° C. for poly(n-butyl methacrylate). Commonly employed "soft" monomers are n-butyl acrylate, 2-ethylhexyl acrylate and n-octyl acrylate, while various methacrylates, including methyl, isopropyl, n-butyl, and t-butyl methacrylate, are typical "hard" monomers.

The $T_g$ of any homopolymer can be readily determined, and the $T_g$ of an interpolymer of two or more such monomers can be predicted, roughly, from the respective $T_g$s of each of the monomers involved. The most exact method of determining the glass transition temperature of a selected interpolymer of any combination of monomers is, of course, measurement of the $T_g$ of that interpolymer per se. The homo- and interpolymers useful in the pressure-sensitive adhesives of this invention typically have $T_g$s of about 0° C. or less, preferably about $-10°$ C. or less. Polymers having lower $T_g$s are particularly preferred for use as low temperature pressure-sensitive adhesives which generally have $T_g$s on the order of about $-40°$ C. or less. Thus, the useful polymers will generally have $T_g$s within the range of about $-80°$ to about 0° C., preferably about $-60°$ to about $-10°$ C.

The described functional monomers and olefinically unsaturated carboxylic acid ester monomers can constitute, when polymerized, the total polymer composition, or a portion of the polymer molecule not accounted for by those two monomer classes can be, when polymerized, any polymerizable, olefinically unsaturated monomer or combination of such monomers. Illustrative of other polymerizable monomers are vinyl esters of carboxylic acids, the acid moiety of which contains from 1 to about 20 carbon atoms (e.g., vinyl acetate, vinyl propionate, vinyl isononanoate); aromatic or aliphatic, alpha-beta-unsaturated hydrocarbons such as ethylene, propylene, styrene, and vinyl toluene; vinyl halides such as vinyl chloride and vinylidene chloride; olefinically unsaturated nitriles such as acrylonitrile; and olefinically unsaturated carboxylic acids having 3 to 10 carbon atoms such as acrylic, methacrylic, crotonic, itaconic, and fumaric acids, and the like.

It has been found that minor amounts of olefinically unsaturated mono- and polybasic carboxylic acids and/or sulfoalkyl esters of such carboxylic acids significantly improve cohesive strength of the PSA polymer. It is presently preferred that the polymer contain at least about 0.1 weight percent, usually about 0.1 to about 10 weight percent, and preferably about 0.1 to about 5 weight percent of a polymerizable, olefinically unsaturated carboxylic acid having up to about 10 carbon atoms and/or a sulfoalkyl ester of such acid, e.g., sulfoethyl methacrylate, sulfoethyl itaconate, sulfomethyl malonate, etc.

Although the polymers can contain other functional monomers such as N-methylol amides, e.g., N-methylol acrylamide, it has been found that such other functional monomers are not essential to achieving acceptable adhesive properties and that the detriment associated with the presence of such monomers, such as formaldehyde release upon curing and loss of tack and adhesion, can be avoided by minimizing the concentration of such N-methylol amides or eliminating them altogether.

Thus, the preferred polymers contain less than about 1 percent, preferably less than about 0.5 percent, and most preferably no amount of N-methylol amide monomer units.

It also has been found that suitable adhesive properties can be achieved without crosslinking or hardening agents such as aldehyde hardeners (e.g., formaldehyde, mucochloric acid, etc.), crosslinking catalysts such as the strong base catalysts discussed by Bartman in U.S. Pat. No. 4,408,018, acid catalysts such as phosphoric or methane sulfonic acid, complexing agents such as metals and metal compounds and complexes, or reactive monomers (e.g., glycols, polyamides, etc.). Since such hardening agents increase the complexity and expense of polymer manufacture, they are not required to obtain the necessary pressure sensitive properties with the polymers of this invention, and, in many instances, the incorporation of such "hardening" agents results in the degradation of other desirable PSA properties such as tack and adhesion, the preferred polymers are substantially free of such hardening agents and their residues. Nevertheless, minor amounts of such materials can be present in the polymers, solutions, dispersions and adhesive articles.

Polymer molecular weight can have a significant effect on the balance of pressure sensitive adhesive properties in polymers of a given monomer composition, i.e. polymers of identical monomer content. Thus, as discussed in Satas, Handbook of Pressure Sensitive Adhesive Technology, particularly at pages 307-311, shear resistance is roughly proportional to molecular weight up to relatively high molecular weights at which shear resistance drops off dramatically in some polymers. Tack is typically high at very low molecular weights and decreases gradually as molecular weight is increased after a molecular weight value yielding optimum tack is exceeded. Adhesion typically exhibits discontinuous behavior, increasing with molecular weight up to moderate molecular weight levels and then gradually decreasing as molecular weight is increased further. The polymers useful in the adhesives of this invention typically have number average molecular weights of at least about 10,000, generally within the range of about 10,000 to about 1,000,000 as determined by gel permeation chromatography. Such polymers have relatively high shear values (cohesive strength) and a favorable balance of other properties including peel value (adhesion) and tack. Thus, the adhesives typically have shear holding values of at least about 20 minutes, typically at least about 50 minutes, and, in high shear formulations, as much as 1,000 minutes or more measured at 75° F. under 500 gram loading as described hereinafter. Peel values are generally at least about 1.5, most often at least about 1.8, and preferably at least about 2 pounds per inch width. Yet the high shear and peel values of these pressure-sensitive adhesives are not achieved at the expense of significant, if any, loss of tack. The polymers generally exhibit tack approximately equivalent to, and sometimes even higher than, the tack exhibited by otherwise identical polymers not containing the described pendant functional groups. For the purposes of this disclosure, properties such as shear strength, peel adhesion, etc., are determined as described hereinafter in connection with the illustrative examples unless otherwise specified.

While the pressure-sensitive adhesives of this invention exhibit sufficient tack for many PSA applications without added tackifiers, such tackifiers may be employed in any tackifying amounts, including minor and major amounts. The adhesives may contain very minor amounts of tackifiers to increase tack only slightly, or they may contain up to 150 weight parts or more of tackifier per 100 weight parts of one or more of the described polymers. Suitable tackifiers include rosins, hydrogenated rosins, esters of such rosins, synthetic hydrocarbon tackifiers and low molecular weight and low $T_g$ polycarboxylic acid esters. Typical rosins and hydrogenated rosin ester tackifiers have ring and ball softening temperatures of about 25° C. to about 115° C., while preferred tackifiers have softening temperatures of about 50° C. to about 110° C. Useful hydrocarbon tackifiers may be manufactured from $C_9$ aromatic monomers or from $C_5$ aliphatic monomers and mixtures of such aromatic and aliphatic monomers. Such monomers are usually derived from the so called $C_9$ and $C_5$ cuts in the fractionation of crude oil or similar material. Such synthetic hydrocarbon tackifiers generally have ring and ball softening temperatures of about 10° C. to about 100° C. The polycarboxylic acid ester tackifier resins are polymerized from one or more monomers such as acrylic acid which is substituted or unsubstituted with alkyl or alkoxy radicals having one to four carbon atoms or with alkyl or alkanol esters of such acids in which the alkyl or alkanol moiety has from one to about six carbon atoms. However, since the useful adhesive compositions can be formulated to provide adequate tack for most situations in the absence of tackifiers, it is presently preferred that the compositions be substantially free of such tackifiers.

Aqueous dispersions and solvent-containing solutions of the useful polymers can be prepared by procedures known in the art to be suitable for the preparation of olefinically unsaturated carboxylic acid ester polymers, such as acrylic ester polymers. For example, aqueous polymer dispersions can be prepared by gradually adding the monomer or monomers to be polymerized simultaneously to an aqueous reaction medium at rates proportionate to the respective percentage of each monomer in the finished polymer and initiating and continuing polymerization with a suitable polymerization catalyst. Illustrative catalysts are free radical initiators and redox systems such as hydrogen peroxide, potassium or ammonium peroxydisulfate, dibenzoyl peroxide, lauroyl peroxide, ditertiarybutyl peroxide, 2,2'-azobisisobutyronitrile and the like, either alone or together with one or more reducing components such as sodium bisulfite, sodium metabisulfite, glucose, ascorbic acid, erythorbic acid and the like. Ultraviolet (UV) and electron beam polymerization methods suitable for initiating free radical polymerization are discussed in the Handbook of Pressure-Sensitive Adhesive Technology, particularly at pages 586-604 and the references cited therein. The reaction is continued with agitation at a temperature sufficient to maintain an adequate reaction rate until most or all monomers are consumed. Monomer addition is usually continued until the latex reaches a polymer concentration of about 10 to about 60 weight percent.

Physical stability of the dispersion usually is achieved by providing in the aqueous reaction medium one or more surfactants (emulsifiers) such as nonionic, anionic, and/or amphoteric surfactants. Illustrative of nonionic surfactants are alkylpolyglycol ethers such as ethoxylation products of lauryl, oleyl, and stearyl alcohols or mixtures of such alcohols as coconut fatty alcohols; alkylphenol polyglycol ethers such as ethoxylation products of octyl- and nonylphenol, diisopropylphenol, triisopropylphenol and di- and tritertiarybutyl phenol. Illustrative of anionic surfactants are alkali metal or ammonium salts of alkyl, aryl, or alkylaryl sulfonates, sulfates, phosphates, and phosphonates. Examples include sodium lauryl sulfate, sodium octylphenol glycolether sulfate, sodium dodecylbenzene sulfonate, sodium lauryldiglycol sulfate, and ammonium tritertiarybutylphenol penta- and octa-glycol sulfates. Numerous other examples of suitable ionic, nonionic and amphoteric surfactants are disclosed in U.S. Pat. Nos. 2,600,831, 2,271,622, 2,271,623, 2,275,727, 2,787,604, 2,816,920, and 2,739,891, the disclosures of which are incorporated herein by reference in their entireties.

Protective colloids may be added to the aqueous polymer dispersions either during or after the reaction period. Illustrative protective colloids include gum arabic, starch, alginates, and modified natural substances such as methyl-, ethyl-, hydroxyalkyl-, and carboxymethylcellulose, and synthetic substances such as polyvinyl alcohol, polyvinyl pyrrolidone, and mixtures of two or more of such substances. Fillers and/or extenders such as dispersible clays, and colorants, such as pigments and dyes, can also be added to the aqueous dispersions either during or after polymerization. Those skilled in the art of emulsion polymers will appreciate that protective colloids, tackifiers, and other additives should be compatible with the polymer emulsion to assure formation of a stable dispersion.

The polymer content of both the aqueous dispersions and solutions can be increased, or the loading of the dispersions and solutions with fillers such as clays, pigments, and other extenders can be increased, without exceeding permissible viscosity limits. For example, aqueous dispersions and polymer solutions can contain more than 2 percent, often more than 5 percent, and even more than 10 percent fillers, colorants, and/or extenders.

The emulsions typically contain about 20 to about 70 percent polymer as manufactured, while preferred latexes typically have solids contents of about 40 to about 60 weight percent polymer solids. The dispersed polymer particles can be of any size suitable for the intended use, although particle sizes of at least about 120 nanometers are presently preferred. Most often, the described latexes will have particle sizes within the range of about 120 to about 1000 nanometers as determined on the model N-4 "Nanosizer" available from Coulter Electronics, Inc., of Hialeah, Fla.

Solutions of the useful polymers can be prepared by polymerizing the selected monomers as described above in solvents in which both the monomers and the polymers are soluble. Suitable solvents include aromatic solvents such as xylene and toluene, alkanes such as hexane, and alcohols such as butanol. Polymerization initiators and reducing components, when employed, should be soluble in the selected solvent or mixture of solvents. Illustrative polymerization initiators soluble in the noted organic solvents include dibenzoyl peroxide, lauroyl peroxide, and 2,2'-azobisisobutyronitrile. Erythorbic and ascorbic acids are illustrative of reducing components soluble in polar organic solvents.

The pressure-sensitive adhesives can be applied to any backing which it is desired to adhere to another surface or article. Illustrative backings include flexible and rigid, natural and synthetic materials such as plastics, elastomers, solid metals and foils, ceramics (tiles, glass, etc.), wood, papers and cardboard, leather materials, etc. of essentially any form including films, solid articles, woven and non-woven textile materials, etc. Illustrative uses of such articles include wall coverings (paper, fabric, films, etc.), upholstery items, construction roofing and siding materials, tapes of all varieties (including those having backings comprised of woven or non-woven fabrics, paper, polymeric films, metal foils, foams, etc., including double-faced tapes and so-called transfer tapes), packaging, floor and wall tile, other floor and wall coverings, and paneling.

Suitable backing and substrate materials can be of essentially any chemical composition and include, for example, metals, ceramics (including glass), and natural and synthetic polar and non-polar materials such as polyolefins, e.g., homopolymers and interpolymers of substituted and nonsubstituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, etc. Essentially all natural materials include one or more polar functional groups. Illustrative are virgin and reclaimed cellulosic fibers such as cotton, paper, wood, coconut fiber, jute, hemp, etc., and, proteinaceous materials such as leather, wool, and other animal fur. Illustrative synthetic materials containing polar functional groups are polyesters, polyamides, carboxylated styrene-butadiene polymers, etc., such as Nylon-6, Nylon-66, Nylon-610, "Dacron", "Fortrel", "Kodel", "Acrilan", "Orlon", "Creslan", "Verel" and "Dynel". Illustrative of other useful polar materials are synthetic carbon, silicon, and magnesium silicate (e.g., asbestos).

The adhesive compositions may be applied to the backing by any one of a variety of conventional coating techniques such as roll coating, spray coating, curtain coating, etc. They also may be applied to the backing without modification by extrusion coating, coextrusion, hot melt coating, etc., by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds of dry adhesive per 3,000 square feet of treated surface are generally adequate. Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

The invention is further described by the following examples, wherein Examples 2, 4, 6, 8, 10, 12, and 13 are illustrative of specific modes of practicing the invention. The examples are not intended as limiting the scope of the invention as defined by the appended claims.

TEST STANDARDS

Unless otherwise indicated, the physical properties (shear strength, peel adhesion, etc.) in the examples which follow are for test strips composed of a backing, one mil in thickness, of OPP (i.e., oriented polypropylene) and a substantially dry coating thereon, one mil in thickness, prepared by applying a sufficient thickness of the corresponding latex or polymeric dispersion to the backing and drying the coating to substantial dryness at approximately 150° F. and aged for 24 hours at 73° F. and 50 percent relative humidity.

Shear strength is determined in accordance with ASTM D3654-78, PSTC-7 and is a measure of the cohesiveness (internal strength) of an adhesive. ("PSTC" designates the Pressure Sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a one-half inch by one-half inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 500 grams applied as a hanging weight from the free end of the test strip. The elapsed time required for each test strip to separate from the test panel at 73° F. is recorded as shear strength.

Corrugated shear is a variation of shear strength and is determined in accordance with the procedure therefor as described, supra, except that (a) the stainless steel panel is replaced with a corrugated cardboard panel; (b) the portion of the adhesive-coated strip in contact with the panel is increased from one-half inch by one-half inch to one inch by one inch; and (c) the 500-gram weight is replaced with a 1,000-gram weight. The elapsed time is recorded as corrugated shear.

Peel adhesion is determined in accordance with ASTM D-3330-78, PSTC-1 and is a measure of the force required to remove a coated, flexible sheet material from a test panel at a specific angle and rate of removal. Unless otherwise specified, the values for peel adhesion reported herein are force values expressed as pounds per inch width of coated test sheet material determined at 73° F. by the following procedure. A one-inch width of the coated sheet is applied to a horizontal surface of a clean, stainless steel test plate with at least five lineal inches of the coated sheet material in firm contact with the steel plate. A hard rubber roller is used to firmly apply the strip and remove all discontinuities and entrapped air. The free end of the coated strip is then doubled back nearly touching itself so that the angle of removal of the strip from the steel plate will be 180°. The free end of the test strip (the one pulled) is attached to the adhesion tester scale (an Instron tensile tester or Harvey tensile tester). The test plate is then clamped in the jaws of the tensile testing machine capable of moving the plate away from the scale at a constant rate of 12 inches per minute. The scale reading in pounds is recorded as the tape is peeled from the steel surface.

EXAMPLE 1

A water-based emulsion of an acrylate polymer containing 98.5 weight percent butyl acrylate and 1.5 weight percent methacrylic acid can be prepared by free radical polymerization of the premixed monomers in the presence of water, surfactants and catalysts in an agitated reactor. The monomer premixture is formed by blending 862 grams butyl acrylate, 13 grams methacrylic acid, and 0.1 gram of chain transfer agent. The catalyst premixture can be formed by dissolving 4.0 grams of sodium persulfate in 114 grams deionized water, and the reactor is then charged with 690 grams deionized water, 20 grams of an alkylphenoxy poly(ethyleneoxy) ethanol surfactant, 2.5 grams of a sodium alkyl sulfonate surfactant, and 60 grams of the monomer premixture. This reactor charge is then heated to 90° C., 10 ml. of catalyst solution is added, and the resulting mixture is agitated for 10 minutes. Monomer premixture and catalyst solution additions are then commenced. Eight hundred ninety ml. of the monomer premixture is added over a period of 2 hours, and the total catalyst solution is added over a period of 2.5 hours. Thus, catalyst addition is continued for one-half hour after monomer addition is discontinued. After catalyst addition is discontinued, the reaction phase is maintained at 90° C. for an additional 1 hour, is then cooled to 35° C. and removed from the reactor. The pH can be adjusted to 7.5 to 8.0 with ammonium hydroxide.

EXAMPLE 2

The operation described in Example 1 can be repeated employing identical reactor feed materials and operating procedures with the exception that the monomer premixture contains 887 grams butylacrylate, 13.7 grams methacrylic acid, and 18.4 grams of acrolein, corresponding to a finished polymer composition of 96.5 weight percent butylacrylate, 1.5 weight percent methacrylic acid, and 2.0 weight percent acrolein.

The polymers of Examples 1 and 2 will exhibit ambient and low temperature peel, tack, and shear values characteristic of low temperature pressure-sensitive adhesives. However, the polymer of Example 2, containing 2 weight percent acrolein, will possess a substantially higher shear value than the polymer of Example 1 and room temperature tack comparable to that of the polymer of Example 1. The adhesive of Example 2 will evidence much less tendency to be gummy and therefore unmanageable, to creep, or to bleed-through adhesive backings or substrates at ambient temperatures than will the polymer of Example 1.

EXAMPLE 3

To a 2-liter reactor equipped with heating mantle, mechanical stirrer, reflux condenser, nitrogen sparge and three laboratory metering pumps are added 140 grams of distilled water, and the water is sparged with nitrogen and heated to 75° C. The nitrogen sparge is then removed and a nitrogen atmosphere is maintained over the liquid phase.

A monomer pre-emulsion is formed by blending 426 grams of 2-ethylhexyl acrylate (EHA), 153 grams of methyl acrylate (MA), 18 grams of acrylic acid (AA), 3 grams of methacrylic acid (MAA), 9 grams of nonylphenoxy poly(ethyleneoxy)ethanol nonionic water-soluble surfactant, and 21 grams of octylphenoxy poly(ethyleneoxy)ethanol nonionic surfactant in 140 grams of distilled water. This pre-emulsion corresponds to a finished polymer composition of, by weight, 71 percent EHA, 25.5 percent MA, 3 percent AA, and 0.5 percent MAA. Five percent of this pre-emulsion is introduced to the reactor with agitation. After stirring for 3 minutes, 0.5 gram of sodium persulphate dissolved in 10 grams of distilled water is added. After a further 3 minutes, 0.5 gram of sodium metabisulfite is added, and the mixture is held at 75° C. for 20 minutes. The remainder of the monomer pre-emulsion is then added gradually over a period of 3 hours through one of the metering pumps provided. The catalyst solutions are added through the two remaining metering pumps and concurrently with monomer emulsion addition. One catalyst solution contains 1.5 grams of sodium persulphate dissolved in 75 grams of distilled water, and the other contains 1.5 grams of sodium metabisulphite dissolved in 75 grams of distilled water. These catalyst solutions are added gradually at a rate such that they are metered into the reactor over a period of 3.5 hours. Monomer addition is discontinued ½ hour before catalyst addition is discontinued, and polymerization temperature is maintained at 75° C. throughout the run. After all of the sodium persulphate and sodium metabisulphite solutions have been added, the reaction mixture is held for an additional 30 minutes at 75° C. and is then cooled to room temperature. The pH of the resulting latex is adjusted to a pH value between 4 and 6.5 with either 7 percent ammonia or 10 percent sodium hydroxide in distilled water. The resulting latex is tested by the procedures described above and is found to have a peel value of 2.6 pounds, a shear value of 186 minutes and a corrugated shear value of 70 minutes. Cohesive failure is exhibited by the latex in the shear test. Cohesive failure is evidenced by tearing or separation of the adhesive itself, with the separated portions of the adhesive remaining adhered to their respective substrates. These results are summarized in Table 2 which follows Example 6.

EXAMPLE 4

The operation described in Example 3 is repeated except that 1.5 grams acrolein is substituted for 1.5 grams of the methyl acrylate, whereby the monomer pre-emulsion contains, by weight, 426 grams (71%) 2-ethylhexyl acrylate (EHA), 151.5 grams (25.25%) methyl acrylate (MA), 18 grams (3%) acrylic acid (AA), 3 grams (0.5%) methacrylic acid (MAA), and 1.5 grams (0.25%) acrolein (ACR). Surfactant compositions and operating procedures are as defined in Example 3.

The resulting latex is tested by the procedures described above and found to have a peel value of 2.2 pounds per inch width, a shear value of 320 minutes (evidencing cohesive failure) and a corrugated shear value of 103 minutes. Although this adhesive has a peel strength about 15% lower than that obtained in Example 3, its shear strength is 72% higher and its corrugated shear is 47% higher. These results are summarized in Table 2. Moreover, the tack of the adhesive of this example is not significantly different from the tack of the adhesive of Example 3.

EXAMPLE 5

The operation described in Example 3 is again repeated except that 6 grams acetoacetoxyethyl methacrylate (AAEMA) is substituted for 6 grams of the methyl acrylate, whereby the monomer pre-emulsion contains, by weight, 426 grams (71%) 2-ethylhexyl acrylate (EHA), 147 grams (24.5%) methyl acrylate (MA), 18 grams (3%) acrylic acid (AA), and 6 grams (1%) AAEMA. Surfactant composition and concentration and operating conditions are otherwise as defined in Example 3. This pre-emulsion differs from the pre-emulsion set forth in Example 4 of the published European Patent Application which bears Publication No. 244997 and claims priority of U.S. application Ser. No. 859,057 filed May 2, 1986 (Spada and Wilczynski), by containing 0.5% MAA, 3% in lieu of 2% AA and 24.5% in lieu of 26% MA.

The resulting latex is tested by the procedures described above and found to have a peel value of 1.9 pounds per inch width, a shear value of 2,017 minutes, and a corrugated shear value of 1,198 minutes.

EXAMPLE 6

The operation described in Example 3 is again repeated except that 6 grams acrolein is substituted for 6 grams of the methyl acrylate, whereby the monomer pre-emulsion contains, by weight, 426 grams (71%) 2-ethylhexyl acrylate, 147 grams (24.5%) methyl acrylate, 18 grams (3%) acrylic acid and 6 grams (1%) acrolein. Surfactant composition and concentration and operating conditions are otherwise as defined in Example 3.

The resulting latex is tested by the procedures described above and found to have a peel value of 1.8 pounds per inch width, a shear value of more than 10,000 minutes, and a corrugated shear value of more than 10,000 minutes. The results demonstrate (a) increases in shear value of over 4-fold and over 53-fold relative to the adhesives of Example 5 and Example 3, respectively; (b) increases in corrugated shear value of over 8-fold and over 143-fold relative to the adhesives of Example 5 and Example 3, respectively; with (c) the peel values being lower by only about 5% and 30%, respectively. Moreover, there is little or no loss in tack relative to the adhesives of Examples 3 and 5.

significantly higher shear strength than will the adhesive of Example 7 with little or no loss of tack.

EXAMPLE 9

The operation of Example 7 can be repeated employing a monomer pre-emulsion containing 582 grams 2-ethylhexyl acrylate and 18 grams acrylic acid corresponding to a polymer composition of 97 weight percent 2-ethyl hexylacrylate and 3 weight percent acrylic acid, with surfactant compositions and operating conditions otherwise remaining the same.

EXAMPLE 10

The operation described in Example 7 can be repeated with the exception that the monomer content of the monomer pre-emulsion corresponds to 576 grams 2-ethylhexyl acrylate, 18 grams acrylic acid and 6 grams acrolein resulting in a polymer containing 96 weight percent 2-ethylhexyl acrylate, 3 weight percent acrylic acid, and 1 weight percent acrolein. This polymer will have significantly higher shear than the polymer obtained in Example 9 with little or no loss in tack.

EXAMPLE 11

The operation described in Example 7 can be repeated with a monomer pre-emulsion having a monomer content of 291 grams butyl acrylate, 291 grams 2-ethylhexyl acrylate, and 18 grams acrylic acid corresponding to a polymer composition of 48.5 weight percent butylacrylate, 48.5 weight percent 2-ethylhexyl acrylate, and 3 weight percent acrylic acid.

EXAMPLE 12

The operation described in Example 7 can be repeated employing otherwise identical compositions and conditions with the exception that the monomer pre-emulsion contains 288 grams butyl acrylate, 288 grams 2-ethylhexyl acrylate, 18 grams acrylic acid, and 6 grams acrolein corresponding to a polymer composition

TABLE

| Ex. No. | MONOMERS, % | | | | | | RESULTS | | |
|---|---|---|---|---|---|---|---|---|---|
| | EHA | MA | AA | MAA | ACR | AAEMA | PEEL | SHEAR | C-SHEAR* |
| 3 | 71 | 25.50 | 3 | 0.5 | 0 | 0 | 2.6 | 186 | 70 |
| 4 | 71 | 25.25 | 3 | 0.5 | 0.25 | 0 | 2.2 | 320 | 103 |
| 5 | 71 | 24.50 | 3 | 0.5 | 0 | 1 | 1.9 | 2,107 | 1,198 |
| 6 | 71 | 24.50 | 3 | 0.5 | 1.00 | 0 | 1.8 | >10,000 | >10,000 |

*Corrugated shear

EXAMPLE 7

A latex can be prepared by the procedures described in Example 3 employing a monomer pre-emulsion containing 582 grams (97 weight percent) butyl acrylate, 18 grams (3 weight percent) acrylic acid, 0.6 gram (0.1 phm, i.e., 0.1 part per 100 parts of monomers) of a sodium salt of sulphated nonylphenoxy poly(ethyleneoxy)ethanol surfactant, and 9 grams (1.5 phm) of the octyl phenoxy surfactant described in Example 3.

EXAMPLE 8

The operation described in Example 7 can be repeated with the exception that the monomer composition in the pre-emulsion contains 576 grams (96 weight percent) butyl acrylate, 18 grams (3 weight percent) acrylic acid, and 6 grams (1 weight percent) acrolein with all other compositions and operating conditions remaining the same. The resulting adhesive will have of 48 weight percent butyl acrylate, 48 weight percent 2-ethylhexyl acrylate, 3 weight percent acrylic acid, and 1 weight percent acrolein. The resulting polymer will have significantly higher shear than the polymer of Example 11 with little or no loss of tack.

EXAMPLE 13

An N-methylolacrylamide-containing polymer can be obtained by the procedure described in Example 7 with the exception that the monomer pre-emulsion contains 288 grams butyl acrylate, 288 grams 2-ethylhexyl acrylate, 18 grams acrylic acid and 6 grams N-methylolacrylamide with all other operating conditions and surfactant compositions being the same as described in Example 7. The resulting polymer will contain 48 weight percent butyl acrylate, 48 weight percent 2-ethylhexyl acrylate, 3 weight percent acrylic acid, and 1 weight percent N-methylolacrylamide. This polymer will have significantly higher cohesive (shear) strength than the polymer described in Example 11 and peel and tack values substantially lower than the peel and tack values of the polymer obtained in Example 12.

While particular embodiments of the invention have been described, it will be understood, of course, that the invention is not limited to these embodiments, since many obvious modifications can be made, and it is intended to include within this invention any such modifications as will fall within the scope of the appended claims.

What is claimed is:

1. A method for preparing a pressure-sensitive adhesive article which consists essentially of coating a substrate on at least a portion of one surface thereof with a normally tacky polymer having a $T_g$ of about 0° C. or less and prepared by a method consisting essentially of copolymerizing a mixture of monomers comprising (a) at least about 40 weight percent of at least one olefinically unsaturated carboxylic acid ester monomer and (b) at least one functional monomer of the formula:

$$R_6-CH=C(R_5)-R_1-CH(=O)$$

in which $R_1$ is (i) a divalent organic radical comprising a carbon atom which directly adjoins the carbonyl carbon atom of the —CHO group or (ii) a covalent bond, and $R_5$ and $R_6$ are independently selected from the group consisting of hydrogen, hydroxy, halo, thio, amino, and monovalent organic radicals.

2. The method defined in claim 1 wherein the polymer has a $T_g$ of about $-10°$ C. or less and comprises at least about 60 weight percent of the polymerized residue of said olefinically unsaturated carboxylic acid ester monomer and about 0.1 to about 40 weight percent of the polymerized residue of said functional monomer.

3. The method defined in claim 2 wherein said olefinically unsaturated carboxylic acid ester monomer is selected from the group consisting of esters of acrylic acid and methacrylic acid having 4 to about 17 carbon atoms and said functional monomer is acrolein.

4. The method defined in claim 1 wherein said polymer comprises about 0.1 to about 5 weight percent of said functional monomer.

5. The method defined in claim 1 wherein said adhesive article has a shear holding value of at least about 50 minutes at 75° F. and a loop tack value of at least about 0.8 pound per half inch.

6. The method defined in claim 1 wherein said polymer is substantially free of polyvalent metals, compounds and complexes.

7. The method defined in claim 1 wherein said polymer is substantially free of crosslinking agents.

8. The method defined in claim 1 wherein $R_1$ is a divalent organic radical up to about 40 atoms in length or a covalent bond.

9. The method defined in claim 1 wherein said polymer comprises about 0.1 to about 10 weight percent of a member selected from the group consisting of acrolein, methacrolein, and combinations thereof, and at least about 60 weight percent of said carboxylic acid ester monomer.

10. The method defined in claim 1 wherein said polymer further comprises at least about 0.1 weight percent of a polymerized monomer selected from the group consisting of polymerized olefinically unsaturated carboxylic acids having up to about 10 carbon atoms, polymerized sulfoalkyl esters of said olefinically unsaturated acids, and combinations thereof.

11. A method for preparing a pressure-sensitive adhesive article which consists essentially of coating a substrate on at least a portion of one surface thereof with a normally tacky polymer having a $T_g$ of about 0° C. or less and prepared by a method consisting essentially of copolymerizing a mixture of monomers comprising
    (a) at least about 40 weight percent of at least one olefinically unsaturated carboxylic acid ester monomer and
    (b) pendant functional groups of the formula:

$$-R_1-CH(=O)$$

wherein $R_1$ is (i) a covalent bond which directly connects the carbonyl carbon atoms of the —CHO group to a carbon atom in the backbone of the polymer or (ii) a divalent organic radical comprising a carbon atom which directly adjoins the carbonyl carbon atom of the —CHO group.

12. The method defined in claim 11 wherein said polymer contains about 0.1 to about 10 weight percent of a functional monomer of the formula:

$$R_6-CH=C(R_5)-CH(=O)$$

wherein $R_5$ and $R_6$ are independently selected from the group consisting of hydrogen, hydroxy, halo, thio, amino, and monovalent organic radicals.

13. A method for preparing a pressure-sensitive adhesive article which consists essentially of coating a substrate on at least a portion of one surface thereof with a water-based latex comprising a continuous aqueous medium containing dispersed particles of a normally tacky polymer having a $T_g$ of about 0° C. or less and prepared by a method consisting essentially of copolymerizing a mixture of monomers comprising
    (a) at least about 40 weight percent of at least one olefinically unsaturated carboxylic acid ester monomer and
    (b) pendant functional groups of the formula:

$$-R_1-CH(=O)$$

wherein $R_1$ is (i) a covalent bond which directly connects the carbonyl carbon atom of the —CHO group to a carbon atom in the backbone of the polymer or (ii) a divalent organic radical comprising a carbon atom which directly adjoins the carbonyl carbon atom of the —CHO group.

14. The method defined in claim 13 wherein said polymer contains about 0.1 to about 10 weight percent of a functional monomer of the formula:

$$R_6-CH=C(R_5)-CH(=O)$$

wherein $R_5$ and $R_6$ are independently selected from the group consisting of hydrogen, hydroxy, halo, thio, amino and monovalent organic radicals.

* * * * *